S. GELLÉRI.
PROCESS OF OBTAINING POTASH AND CEMENT CLINKER.
APPLICATION FILED MAY 12, 1911.
1,058,686.
Patented Apr. 8, 1913.
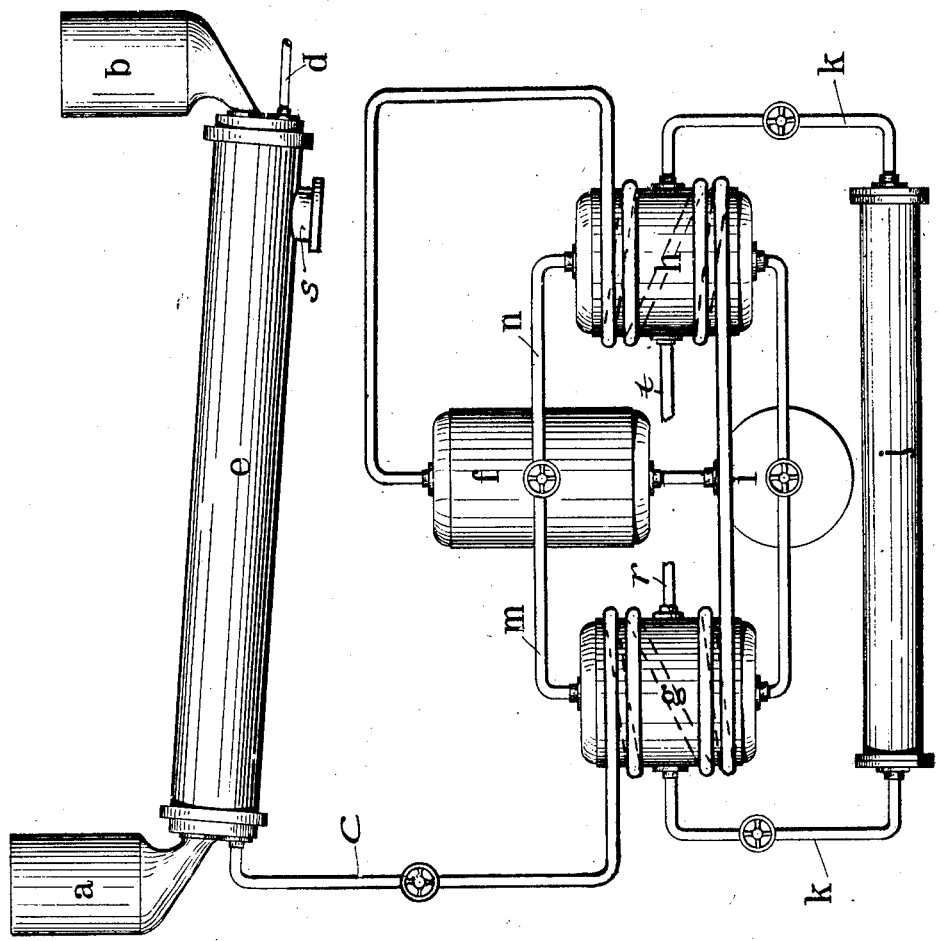

UNITED STATES PATENT OFFICE.

SOMA GELLÉRI, OF BUDAPEST, AUSTRIA-HUNGARY, ASSIGNOR OF ONE-HALF TO DR. ANTON HAMBLOCH, OF ANDERNACH, GERMANY.

PROCESS OF OBTAINING POTASH AND CEMENT CLINKER.

1,058,686.      Specification of Letters Patent.      Patented Apr. 8, 1913.

Application filed May 12, 1911. Serial No. 626,732.

*To all whom it may concern:*

Be it known that I, SOMA GELLÉRI, chemist, of Budapest, Austria-Hungary, have invented a certain new and useful Process of Obtaining Potash and Cement Clinker, of which the following is a specification.

Silicates are burned with lime, or generally with an oxid or carbonate of an alkaline earth metal or magnesium for the purpose of opening up or decomposing the silicate and obtaining potash and cement clinker. After the silicates have been opened up in this manner, however, a large part of the alkalis in them is still not in the free condition in which alkalis can be leached out of the silicates by water; that is to say, the silicates even after they have been burned with the said oxids or carbonates always still constitute a combination consisting of aluminate, silicic acid and alkalis, from which a large part of the alkalis cannot be separated by water.

By the process which constitutes the present invention this disadvantage is overcome by subjecting the silicates in a closed chamber to the action of ammonium carbonate vapor under pressure, either after they have been burned with the said oxids or carbonates or without this preliminary burning. In this manner the silicates are completely opened up and the whole of the alkalis can be leached out by water as alkali carbonate. The opening up takes place in the presence of water vapor and potash feldspar according to the following equation:

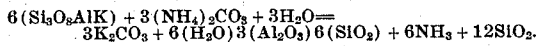

$6(Si_3O_8AlK) + 3(NH_4)_2CO_3 + 3H_2O =$
$3K_2CO_3 + 6(H_2O)3(Al_2O_3)6(SiO_2) + 6NH_3 + 12SiO_2.$

This process presents the advantage that in the reaction the whole of the ammonia of the ammonium carbonate is liberated, so that after the reaction is finished the free ammonia can be used again for making ammonium carbonate, and most advantageously and economically by saturating the ammonia with carbon dioxid from the furnace wherein the silicates are burned with limestone; in this manner the ammonia operates continuously as a carrier of carbon dioxid.

In order that a separate heating installation and separate fuel may not be necessary for heating the silicates with ammonium carbonate, the furnace gases coming from the burning kiln may be used.

If the silicates have been burned with lime before being treated with ammonium carbonate they contain all the constituents corresponding with the composition of Portland cement, so that it is possible to burn the silicates which have been opened up and freed from alkalis, to Portland cement by again heating them.

The method of carrying out the operation in practice will now be described with the aid of the accompanying drawing, which represents in elevation an apparatus suitable for carrying out the process according to this invention.

A mixture of three parts by weight of limestone and one part by weight of feldspar is passed in a finely divided condition from a container $a$ into a rotary furnace $e$, which is supplied at the opposite end with powdered carbon from a container $b$. A temperature of 1200–1300° C. is preferably maintained in the furnace, that is generally such a temperature, that a pulverulent, friable mass is formed from the mixture, without its being converted into glass. The burnt mass slides from the furnace through the socket $s$ into a cooling vessel not shown in the drawing, through which the air, which is to be forced through the pipe $d$, passes in the opposite direction, so as to be heated beforehand. The mass is then led in any suitable manner from the cooling vessel into the vessels $g$ and $h$, which are used alternately, and in which the mass is heated up to about 100°–105° C. with ammonium carbonate vapor introduced through the pipes $r$ and $t$ at about 10–12 atmospheres pressure.

For the purpose of recovering the ammonium carbonate the carbon dioxid is drawn off from the rotary oven $e$ and led into a condenser $f$ into which the ammonia is led alternately from the vessels $g$ and $h$ through the pipes $m$ and $n$ after the silicates have been opened up; the ammonium carbonate formed here is collected in a reservoir $i$ and the sludge of the opened up mass pumped through the pipes $k$ into a filtering device $j$. The liquid flowing from the sludge in the filter contains the alkalis and is evaporated to recover these. In order to use the heat of the rotary oven to warm the vessels $g$ and $h$, the carbon dioxid coming from the rotary oven is led from the oven $e$ through the pipe $c$ around the vessels *g* and *h* in spiral tubes before entering the condenser. Care must be taken that the temperature of the gases in the condenser remains under 40° C. in order to form ammonium carbonate. The pipes leading to the opening up vessels are provided with suitable valves.

What I claim and desire to secure by Letters Patent of the United States is:

1. Process of obtaining potash and cement clinker, which process comprises first burning silicates containing alkali metal compounds with a salt of an alkaline earth metal, then introducing them into a closed chamber, then subjecting them to the action of ammonium carbonate vapor under high pressure, then bringing the ammonia liberated during this subjection into contact with carbon dioxid evolved in the aforesaid burning operation so as to form ammonium carbonate, and finally heating a further quantity of burned silicates with the vapor of the last-named ammonium carbonate.

2. Process of obtaining potash and cement clinker, which process comprises first burning silicates containing alkali metal compounds with an alkaline earth metal, then introducing them into a closed chamber and finally heating them with ammonium carbonate vapors under high pressure by means of the gases produced in burning the silicates.

3. The process of obtaining potash and cement clinker, which process comprises first burning silicates containing alkali metal compounds with a salt of an alkaline earth metal, then introducing them into a closed chamber and finally subjecting them to the action of ammonium carbonate vapors under high pressure.

4. The process of obtaining potash and cement clinker, which process consists in first burning silicates containing alkali metal compounds with a salt of an alkaline earth metal, then introducing them into a closed chamber, then subjecting them to the action of ammonium carbonate vapors under high pressure, then leaching them so as to remove the alkalis, and finally burning them again.

In testimony whereof I have signed my name to this specification in the presence of two subscribing witnesses.

SOMA GELLÉRI.

Witnesses:
E. P. KELEMENT,
HUGH KENEIRY.